Aug. 11, 1964   R. A. BILANCIA   3,144,270
VENTILATED VEHICLE SEAT
Filed Nov. 1, 1961   6 Sheets-Sheet 1
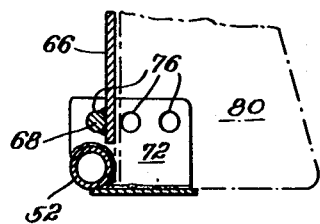
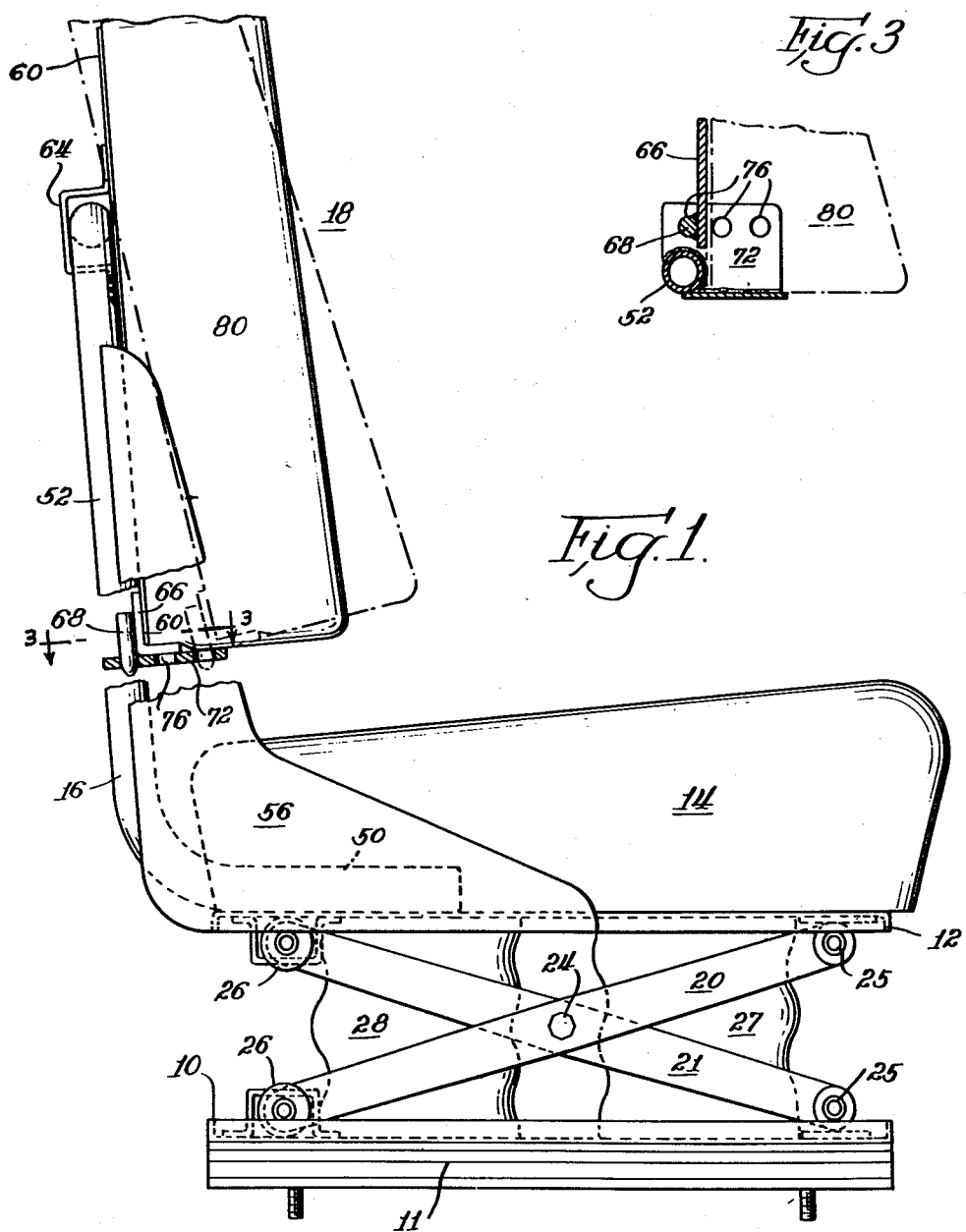
INVENTOR
Raymond A. Bilancia
By Merriam, Smith & Marshall
Att'ys INVENTOR
Raymond A. Biloncia
By Merriam, Smith & Marshall
Attys.

INVENTOR
Raymond A. Bilancia

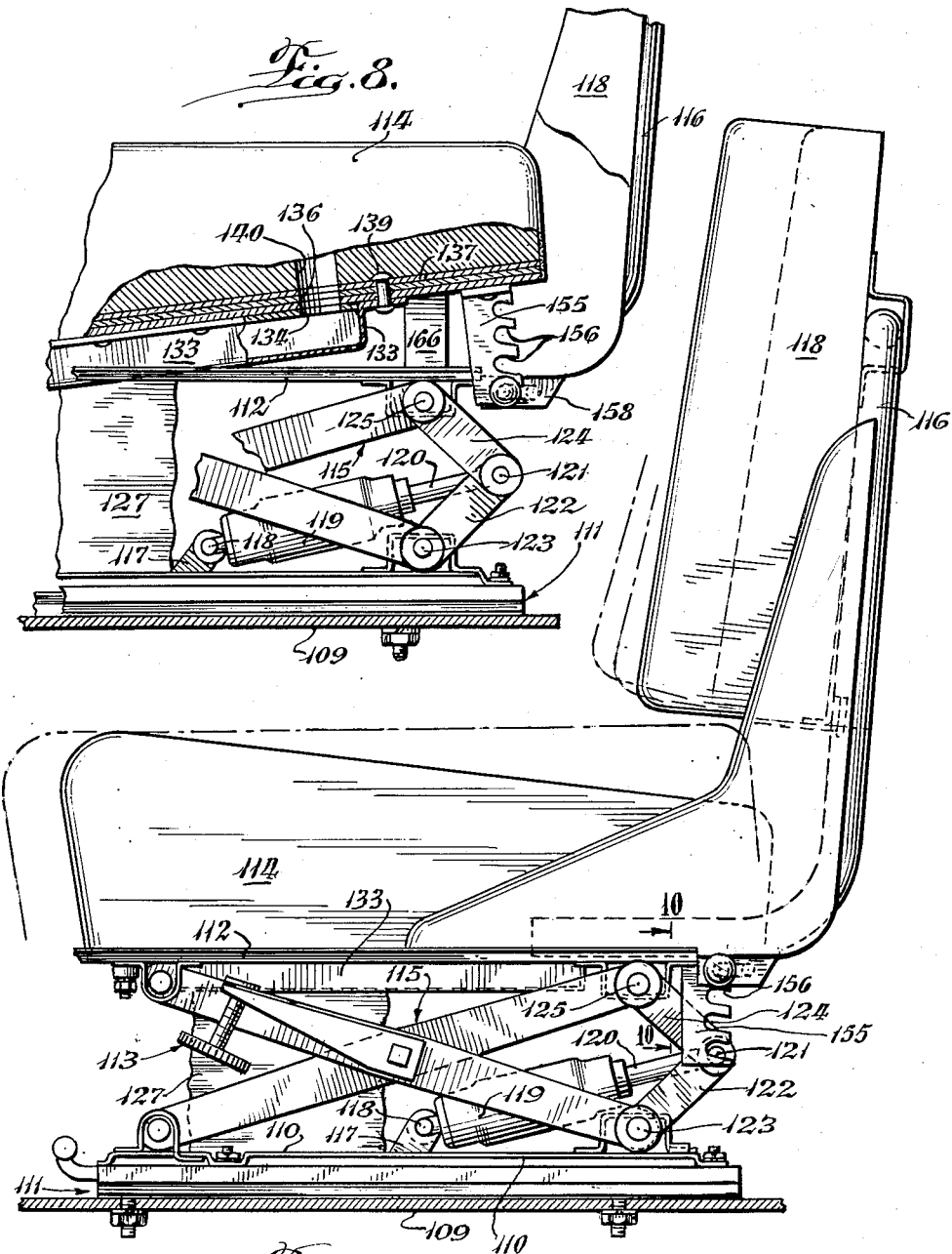

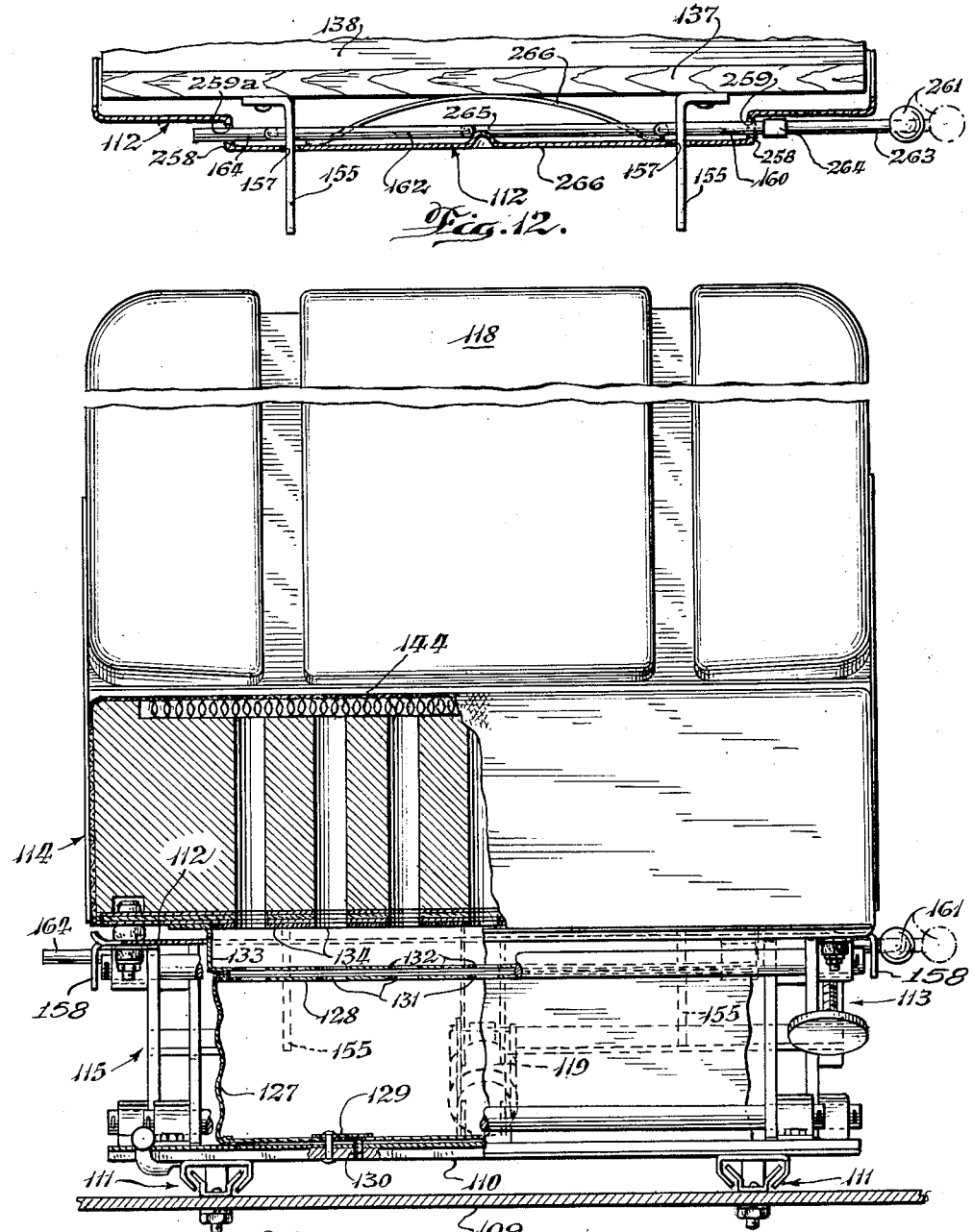

Aug. 11, 1964 R. A. BILANCIA 3,144,270
VENTILATED VEHICLE SEAT
Filed Nov. 1, 1961 6 Sheets-Sheet 6
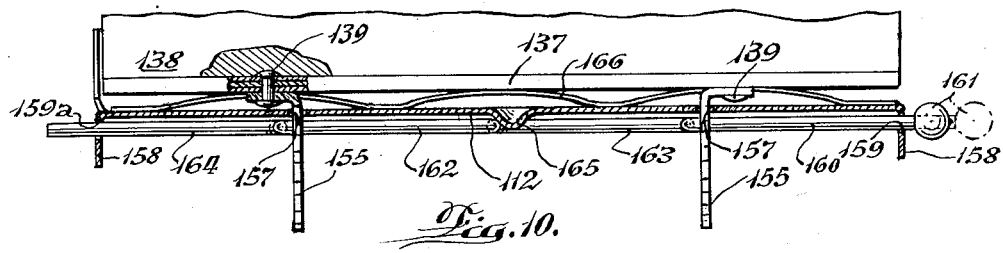
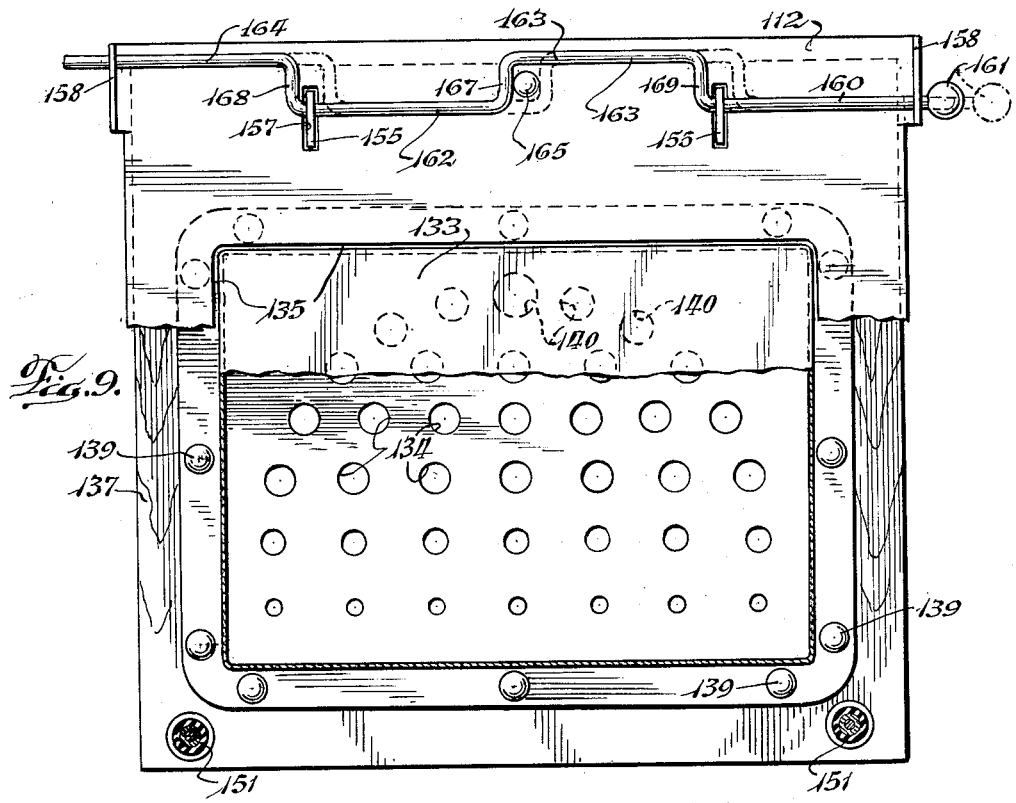
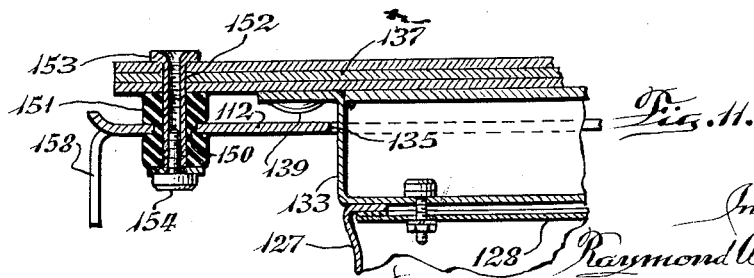

United States Patent Office 3,144,270
Patented Aug. 11, 1964

3,144,270
VENTILATED VEHICLE SEAT
Raymond A. Bilancia, Rolling Meadows, Ill., assignor to Coach & Car Equipment Corporation, Chicago, Ill., a corporation of Illinois
Filed Nov. 1, 1961, Ser. No. 149,458
12 Claims. (Cl. 297—180)

This invention relates generally to vehicle seats and more particularly to an adjustable vehicle seat having improved ventilating means.

This is a continuation in part of the present inventor's application Serial No. 136,292, filed September 6, 1961.

Present vehicle seats, and especially seats for trucks, are provided with a seat cushion formed of sponge rubber or like material. Such cushions are hot and uncomfortable, especially in the summertime, because they are imperforate and do not allow air to pass therethrough or along the surface of the cushion in contact with the body of the occupant.

It is an object of the present invention to provide a new and improved vehicle seat cushion which is fully ventilated and which allows air to flow therethrough, even when a user or occupant is sitting on the seat.

Another object is to provide a vehicle seat wherein the up and down movement of the seat's occupant during normal riding serves to pump a current of air towards his body.

Another object is to provide a vehicle seat having a seat cushion made from resilient foam material which is freely ventilated and prevents discomfort to the user, such as would otherwise occur from the use of such material.

A further object is to provide a vehicle seat having means to pump a current of air against the body of the user and additional means for regulating such current of air.

Other objects and advantages of the invention will appear from the following description taken in connection with the appended drawings in which:

FIGURE 1 is a side elevational view of a seat constructed in accordance with the invention;

FIGURE 3 is a fragmentary cross-sectional view of the seat of FIGURE 1 taken at section 3—3;

FIGURE 6 is a side elevational view of another embodiment of a vehicle seat constructed in accordance with the present invention;

FIGURE 7 is a front elevational view, partially broken away and partially in section, of the seat of FIGURE 6;

FIGURE 8 is a fragmentary view of a portion of the seat as shown in FIGURE 6, with the seat adjusted to a different position relative to the horizontal;

FIGURE 9 is a bottom plan view, partially broken away, of the seat of FIGURE 6;

FIGURE 10 is a sectional view taken along line 10—10 in FIGURE 6 and showing adjusting means for the subject seat;

FIGURE 11 is an enlarged fragmentary sectional view of a portion of the seat as shown in FIGURE 7; and FIGURE 12 is a sectional view similar to FIGURE 10 showing another embodiment of adjusting means.

Figure 2:
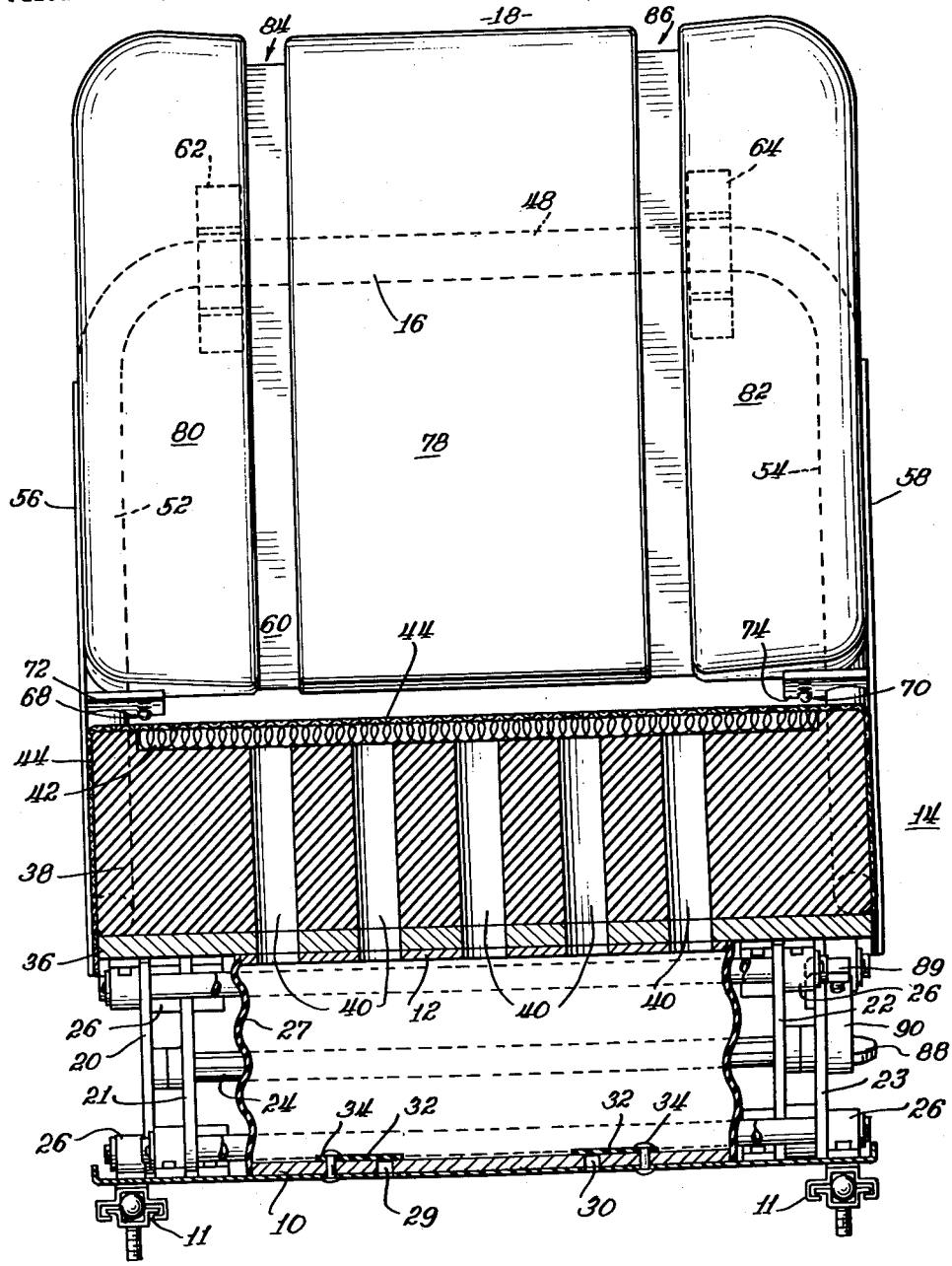
FIGURE 2 is a front elevational view of the seat of FIGURE 1.
Figure 4:
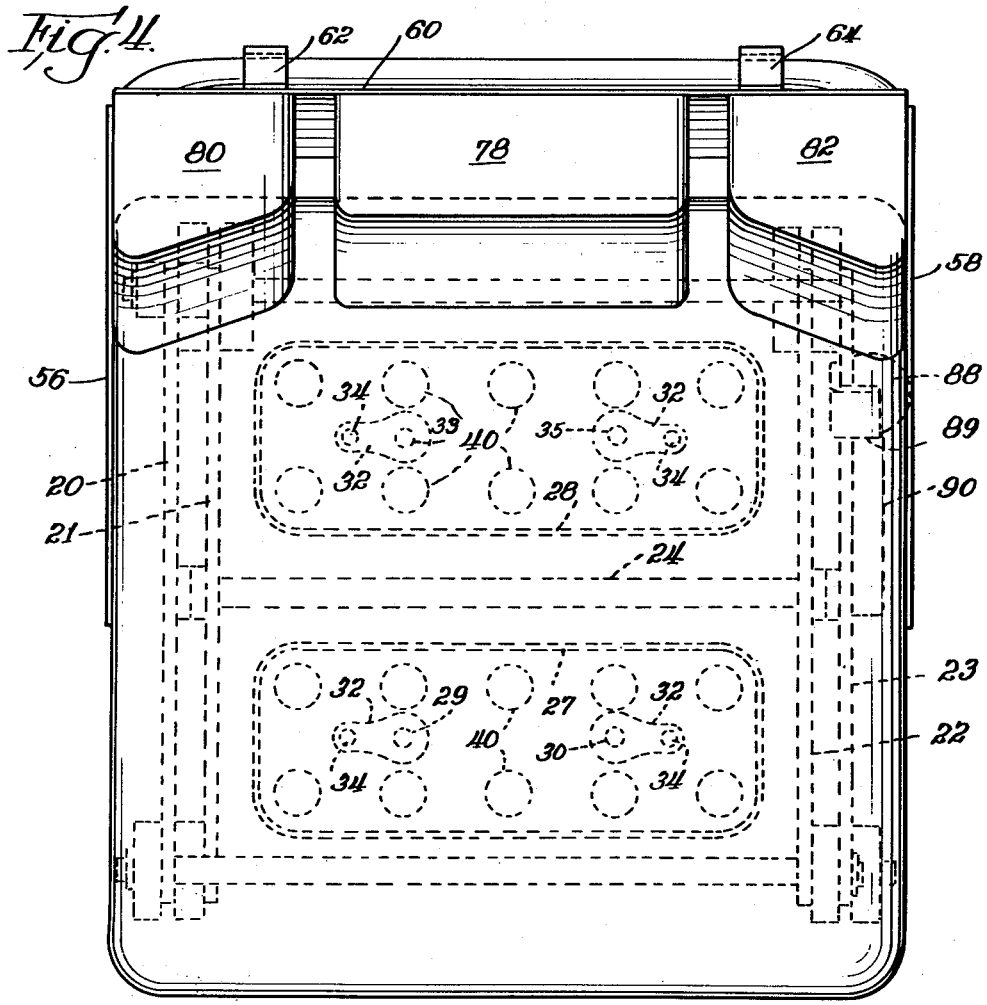
FIGURE 4 is a plan view of the seat of FIGURE 1.

The seat of the present invention includes a base plate 10 mounted for fore and aft movement on a suitable slide assembly 11 of conventional construction. Disposed above the base plate and supported by a resilient supporting mechanism is a seat plate 12 for carrying a seat cushion 14 and a back support member 16. A back cushion assembly 18 is fixed to the back support member 16 in a manner hereinafter to be described.

Figure 5:
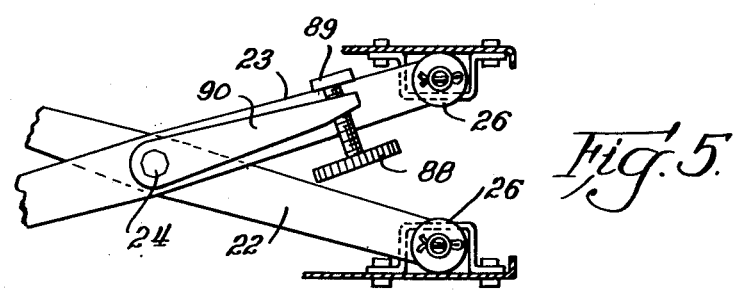
FIGURE 5 is a fragmentary view of an adjusting mechanism associated with the seat of FIGURE 1.

The resilient supporting mechanism by which the seat plate 12 is suspended above the base plate 10 comprises two pairs of levers 20, 21 and 22, 23, one pair of each side of the seat. Lever 20 is non-rotatably connected to a torsion bar 24, and lever 23 is non-rotatably connected to torsion bar 24 by means of an adjusting lever 90 (FIGURE 5). Each of the levers has one end 25 pinned to either the base plate 10 or seat plate 12 and the other end provided with a roller 26 in rolling contact with either the base plate 10 or the seat plate 12. This mechanism is more fully described in co-pending application Serial No. 136,292, entitled "Vehicle Seat Support" and filed September 6, 1961.

In the embodiment illustrated in FIGURE 1, two bellows 27 and 28 are retained between the base plate 10 and the seat plate 12, one on each side of torsion bar 24, with opposite bellow ends attached to a respective one of these plates. In the illustrated embodiment a pair of check valves 29, 30 are located in base plate 10 to help control the ingress and egress of air when the bellows expands and contracts. A similar pair of check valves 33, 35 are installed within the area of base plate 10 surrounded by bellows 28. Each of the check valves is provided with a flexible valve member 32, normally lying flat against base plate 10 and having one end tightly connected to the base plate by a rivet 34.

In use, the distance between base plate 10 and seat plate 12 varies as the seat 14 springs up and down in response to movement of the suspension system. When the distance between base plate 10 and seat plate 12 increases during upward movement of seat 14 relative to base plate 10, both of the bellows expand and air is admitted through the check valves 28, 30, 32 and 34. However, when seat 14 moves downwardly relative to base plate 10 and the bellows 26 contracts, air cannot escape through the check valves but is instead directed upwardly through the seat 14 in a manner now to be described.

Referring to FIGURE 2, seat 14 comprises a cushion board 36 having a plurality of apertures aligned with corresponding apertures in seat plate 12. Adjacent the cushion board is a cushion 38 formed from resilient spongy material commonly known as "sponge rubber," or the like. Cushion 38 is provided with a multiplicity of cored holes 40 opening into the apertures in cushion board 36, and extending vertically through cushion 38.

In the top portion of cushion 38 is a coiled plastic layer 42 located adjacent the upper ends of cored cushion holes 40. The entire seat assembly is covered with a perforated plastic cover 44 extending around the sides of cushion 38 and under the lower surface of cushion board 36, to which cover 44 is stapled. Coiled plastic layer 42 acts as a diffusion mechanism to provide a substantially even flow of air through the entire upper surface of plastic cover 44.

Seat 14, therefore, includes a plurality of air passageways communicating with bellows 27, 28 and extending completely through seat 14 to the upper surface of perforated plastic cover 44.

Back support member 16 comprises a tube bent to form a central horizontal portion 48 (FIGURE 2) and two horizontal ends portions, one of which is shown as 50 in FIGURE 1. A pair of vertical portions 52, 54 join central horizontal portion 48 to the horizontal end portions.

Horizontal end portion 50 is welded to base plate 12 at one side of the seat and the other end portion of back support tube 16 is similarly welded to base plate 12 at the other side of the seat. A pair of gussets 56, 58 are welded to back support tube 16, one at each side of the seat. Gusset 56 is welded at vertical portion 52 and horizontal end portion 50, while gusset 58 is welded to corresponding portions of the back support 16 on the other side of the seat. Gussets 56, 58 strengthen tube 16 and rigidify the structural configuration described above.

Mounted adjacent tube 16 is a back plate 60 having a pair of brackets 62, 64 connected thereto by bolts (not shown), each of said brackets surrounding the central horizontal portion 48 of back support tube 16. The dimensions of each of the brackets 62, 64 are large enough to enable substantial sliding movement of back plate 60 relative to tube horizontal central portion 48 in a direction parallel to the plane of the back plate 60, and to permit back plate 60 to pivot about the axis of tube central portion 48.

An L bar 66 is attached at the lower portion of back plate 60 by bolts (not shown). L bar 66 has a pair of pins 68, 70 welded thereto, one near each end of the L bar, said pins extending a short distance below the bottom portion of back plate 60.

Two index plates 72, 74 are welded to vertical portions 52, 54 of back support tube 16 and extend horizontally forward therefrom (FIGURE 3). Each index plate 72, 74 is provided with three apertures 76 of a diameter slightly larger than the diameters of pins 68, 70, apertures 76 in each index plate being arranged in a row extending forward from back support tube 16. Each aperture 76 is adapted to receive one of the pins 68, 70 on a respective side of the seat. Back plate 60 may be lifted relative to central portion 48 of back support tube 16 and rotated thereabout until the desired angular position of back 18 is attained, whereupon back plate 60 is lowered so the pins 68, 70 nest in a respective pair of apertures 76 corresponding to that angular position. The weight of back plate 60 and the assembly attached thereto is sufficient to normally maintain pins 68, 70 in the desired pair of apertures.

The inclination of seat back 18 may be thus adjusted to a variety of positions, so as to provide the most comfortable arrangement for the seat's occupant.

Back 18 is provided with a central back rest 78 and two wing-back rests 80, 82 located on respective opposite sides of central back rest 78. Each of the back rests 78, 80 and 82 includes an inner back plate bolted to back plate 60 by bolts (not shown), and a cushion constructed of "sponge rubber" and covered with plastic material. The two wing-back rests 80, 82 have a resiliency different from that of the central back rest 78 through the use of a different type of "sponge rubber." Wing-back rests 80, 82 may be either harder or softer than the central back rest 80, to make the seat most comfortable for the average user. Each of the back rests 78, 80 and 82 is rigidly attached to the back plate 60 and is rotatable therewith about the back support 16 in the manner hereinbefore described.

The combined width of the three cushions 78, 80 and 82 is less than the width of back plate 60, and two spaces 84, 86 are left between central back cushion 78 and wing cushion 80, and between central back cushion 78 and wing cushion 82, respectively. Spaces 84, 86 define passageways permitting the circulation of air between the cushions forming the back 18, and providing ventilation of seat back 18 even when an occupant is resting thereagainst.

Referring now to FIGURE 5, there is shown a partial elevational view of the adjusting mechanism of the seat suspension disclosed and claimed in the abovementioned co-pending application. This adjusting mechanism is provided with a screw 88 secured to one of the levers 23 and adapted to abut a stop 89 carried rigidly on lever 23. Screw 88 is threaded through an adjusting lever 90, nonrotatably secured to torsion bar 24. Lever 23 is rotatably mounted on torsion bar 24. As disclosed in the co-pending application, the rotation of screw 88 adjusts the initial height of the seat plate 12, and therefore the relative amount of movement between seat plate 12 and base plate 10.

FIGURES 6 to 11 illustrate another embodiment of the subject invention. Referring initially to FIGURES 6 and 7, this embodiment includes a base plate 110 mounted on a conventional sliding arrangement indicated generally at 111 and resting on the floor board 109 of the vehicle. Spaced vertically above base plate 110 is a seat plate 112 mounted on resilient supporting means indicated generally at 115. Resilient supporting means 115 is like that illustrated in FIGURES 1 and 2, previously described in detail, and includes adjusting means indicated generally at 113, said adjusting means being similar to that described with reference to FIGURES 2 and 5. Seat plate 112 supports a seat horizontal portion 114 and a back portion support member 116 mounting a back rest portion 118.

Located between the rear portions of vertically spaced base plate 110 and seat plate 112 is shock-absorbing means now to be described. Mounted on base plate 110 is a bracket 117 pivotally connected at 118 to a dash pot 119 outwardly from which extends a rod 120 having its outer end pivotally connected to a shaft 121 pivotally mounted between a pair of lower link members 122 pivotally mounted on a lower roller shaft 123 (a part of the resilient supporting mechanism 115), and a pair of upper link members 124 pivotally mounted on an upper roller shaft 125 (a part of resilient supporting mechanism 115).

Because the shock-absorbing means just described occupies the space between the rear portions of the base plate and seat plate, the instant embodiment is provided with only one bellows 127, located between the front portions of the base plate and seat plate, together with means, to be described subsequently, for directing air from the bellows toward the rear of portion 114.

Referring to FIGURES 6 and 7, bellows 127 is associated with a check valve 129 for controlling air entering the bellows through an opening 130 in base plate 110. Bellows 127 includes a top portion 128 having a plurality of openings 131 communicating with lower openings or air entrance means 132 in a pan or air confining means 133 located above bellows 127, extending rearwardly therefrom, received in an opening 135 (FIGURE 11) in seat plate 112, and attached to the lower surface of a seat cushion board 137 by rivets 139 (FIGURE 11). Pan 133 includes a plurality of upper openings or air exit means 134 communicating with openings 136 in cushion board or member 137, said openings 136 in turn communicating with vertically extending openings 140 in a seat cushion 138 constituting a part of seat portion 114 also including an upper coiled plastic air-diffusing layer 142 and a perforate cover 144.

Pan 133 directs air pumped by bellows 127 toward rearward parts of horizontal portion 114 not overlying the bellows. To assure that the amount of air passing upwardly through openings 140 at the rear of seat portion 114 (not overlying bellows 127) corresponds substantially to the amount of air passing upwardly through openings 140 in the front of portion 114 (overlying bellows 127), the openings 140 at the rear of portion 114 are provided with larger diameters than those at the front of the seat (FIGURE 9). As is also indicated by FIGURE 9, openings 140 are arranged in a substantially horseshoe shaped configuration with the bend of the horseshoe toward the rear of portion 114 so as to conform to the outline of the seated occupant. By virtue of this arrangement, virtually none of the upwardly forced air is wasted by being pumped through parts of the seat's horizontal portion over which the body of the occupant does not lie.

Means, now to be described, are also provided to adjust the angular disposition of seat portion 114 relative to seat plate 112. Referring to FIGURES 6, 7 and 11, located adjacent the front corners of seat plate 112 are a pair of apertures 150 (FIGURE 11) through each of which extends a respective tubular yieldable grommet 151 composed of rubber or the like. The bottom portion of grommet 151 extends below seat plate 112, and the top portion of grommet 151 extends above seat plate 112 to support cushion board 137. Extending downwardly through cushion board 137 and into tubular grommet 151 is an internally threaded tubular member 152 having an upper flange portion 153 resting atop cushion board 137. Extending upwardly through grommet 151 and threadably engaging member 152 is a bolt 154.

By virtue of the yieldable frontal connection provided by grommet 151 and elements 152, 154, the rearward parts of the cushion board 137 together with parts of attached seat portion 114 and attached pan 133 may be elevated or depressed relative to seat plate 112. During such adjustments the front parts of cushion board 137, adjacent grommet 151, remain relatively stationary while the rearward parts of cushion board 137 are elevated or depressed. Grommet 151 is yieldable enough to absorb the compressive or tensile force imparted thereagainst by cushion board 137, seat plate 112 and elements 152, 154 during elevation or depression respectively, of the rearward parts of cushion board 137. Thus cushion board 137 may be tilted relative to seat plate 112 about the frontal connection at grommets 151.

The rearward parts of cushion board 137 are locked in a selected elevated or depressed position by means now to be described. Referring to FIGURES 8, 9 and 10, at the rear of cushion board 137, inwardly of the side edges thereof, are a pair of downwardly extending brackets 155 each having a plurality of notches 156 extending inwardly from the rear edge of the bracket (FIGURE 8). Each bracket 155 is received within a slot 157 in seat plate 112, said slot 157 being large enough to accommodate bracket 155 as the attached cushion board 137 is raised or lowered. Extending downwardly along the side edges of seat plate 112, at the rear thereof, are a pair of ears 158 having respective openings 159, 159a for receiving opposite end portions 160, 164, respectively, of a crank-shaped adjusting rod also including a pair of parallel, intermediate or offset portions 162, 163 linked by a connecting portion 167. Other connecting portions 168, 169 link rod portions 162, 164 and 160, 163, respectively.

Located at the outer extremity of end portion 160 is a knob or handle 161 to facilitate grasping by an operator for imparting axial movement to the crank-shaped rod. End portion 160 and intermediate portion 162 are receivable in one of the notches 156 of a respective one of the brackets 155 whereas end portion 164 and offset portion 163 are not. To lock seat portion 114 in a predetermined angular disposition relative to seat plate 112 and crank-shaped rod is disposed in the position shown in full lines in FIGURE 9. In this position rod portions 160, 162 are in axial alignment with brackets 155 as well as being in transverse alignment therewith so that rod portions 160, 162 are received in a respective one of the bracket notches 156. Axial movement of the rod in a direction to the right as viewed in FIGURE 9 is normally prevented by engagement of connecting portion 167 with a dimple 165 constituting a depression in seat plate 112. Axial movement of the rod to the left as viewed in FIGURE 9 is prevented by engagement of knob 161 with the downwardly extending ear 158 on seat plate 112. As a result the rod is held in place and in turn locks the cushion board in place.

When cushion board 137 is to be adjusted relative to seat plate 112, the crank-shaped rod is moved in an axial direction to the right as viewed in FIGURE 9 and to the position shown in the dash-dot lines. The rod is springable enough so that connecting portion 167 will ride over the dimple 165 when a sufficient axial force is manually applied to the rod. This force is substantially greater than that which is imparted to the rod by the normal jiggling movement occurring during movement of the vehicle over rough terrain. When connecting portion 167 is pulled over dimple 165, end portion 160 and intermediate portion 162 are displaced from transverse alignment with their respective brackets 155 so that rod portions 160, 162 are no longer engaged within bracket notches 156, and the disengaged brackets are freed for movement in a vertical direction through slots 157, thereby enabling adjustment of the angular disposition of cushion board 137 relative to seat plate 112.

After the desired angular disposition of cushion board 137 is obtained, it may be locked in position by pushing inwardly on knob 161 of the crank-shaped rod to effect an inward axial movement of the rod portions from the position shown in the dash-dot lines in FIGURE 9 to the position shown in the full lines, whereupon rod portions 160, 162 are again received within notches 156 in brackets 155, thereby locking cushion board 137 in place. In this manner cushion board 137, together with seat portion 114 and pan 133, may be adjusted from the position shown in FIGURE 6 to the position shown in FIGURE 8, for example.

If desired, the instant embodiment may be provided with a leaf-spring 166 located at the rear of the seat between seat plate 112 and cushion board 137 (FIGURES 8 and 10), said leaf-spring 166 normally urging cushion board 137 and seat portion 114 upwardly relative to seat plate 112.

Another embodiment of means for adjusting the angular disposition of cushion board 137 relative to seat plate 112 is illustrated in FIGURE 12. In this embodiment the principal differences, as compared to the embodiment of FIGURE 10, are that seat plate 112 includes a central downwardly extending dished portion having side walls 258 containing openings 259, 259a for receiving rod portions 160, 164 respectively; and the dimple or stop means 265 extends upwardly from the bottom 266 of dished portion 250. Spring 266 performs the same function as spring 166 in the embodiment of FIGURE 10. Rod portion 160 may be connected by a coupling 264 to an extension 263 terminating at a handle 261.

The foregoing detailed description has been given for clearness of understanding only, and no unnecessary limitations should be understood therefrom, as modifications will be obvious to those skilled in the art.

What is claimed is:
1. A ventilated seat comprising:
cushion means;
a plate spaced below said cushion means;
means for resiliently supporting said cushion means on said plate;
bellows located between the cushion means and the plate and compressible in response to downward movement of said resiliently supported cushion means and expandable in response to upward movement of the resiliently supported cushion means;
an upper opening in said bellows;
the area of said upper opening in said bellows being only a portion of the area of the bottom of said cushion means, whereby only a portion of said cushion means overlies the upper opening in the bellows;
means for admitting air into the bellows in response to expansion thereof;
openings located along substantially the entire area of the cushion means bottom, said openings extending through said cushion means;
and air confining means having lower air entrance means communicating with said upper opening in the bellows and upper air exit means in communication with all of said openings in said cushion means bottom.
2. A ventilated seat as recited in claim 1 wherein:
said bellows is located below only the front portion of the cushion;

said openings in the cushion means being arranged in a substantially horseshoe shaped configuration with the bend of the horseshoe being toward the rear of the cushion means;

the diameter of said cushion openings increasing progressively toward the rear of said cushion means.

3. In a seat:

a cushion member;

a seat plate;

means connecting the lower front portion of said cushion member to the front of said seat plate to permit tilting of the cushion member about said connecting means, relative to said seat plate;

spring means between said seat plate and said cushion member, behind said connecting means, and normally urging said cushioning member upwardly;

a slot in said seat plate behind the connecting means;

a bracket projecting downwardly from said cushion member and normally extending through said slot;

a plurality of notches in said bracket;

a rod;

and means mounting said rod on said seat plate for sliding movement of the rod in an axial direction between a first position in which the rod is engaged with one of said notches and a second position in which the rod is disengaged from the notches.

4. In a seat as recited in claim 3 wherein said rod comprises:

a first portion in axial alignment with said bracket;

a substantially parallel second portion not in axial alignment with said bracket;

a third portion extending transversely to and connecting said first and second portions;

said first rod portion being in transverse alignment with the bracket when the rod is in said first position;

said first rod portion being out of transverse alignment with the bracket when the rod is in said second position.

5. In a seat as recited in claim 4 and comprising:

stop means on said plate engageable with said connecting portion of the rod for preventing axial movement of said rod in the absence of a predetermined axial force applied to the rod.

6. In a seat as recited in claim 5 wherein said stop means includes vertically extending dimple means on said seat plate.

7. A ventilated seat comprising:

cushion means;

a plate spaced below said cushion means;

means for resiliently supporting said cushion means on said plate;

bellows located between the cushion means and the plate and compressible in response to downward movement of said resiliently supported cushion means and expandable in response to upward movement of the resiliently supported cushion means;

an upper opening in said bellows;

means for admitting air into the bellows in response to expansion thereof;

the area of said upper opening in said bellows being only a portion of the area of the bottom of said cushion means, whereby only a portion of said cushion means overlies the upper opening in said bellows;

and means communicating with said upper opening in the bellows for directing air upwardly substantially evenly through both those portions of the cushion means which do and those which do not overlie the upper opening in the bellows.

8. A seat as recited in claim 7 wherein said last recited means comprises:

a multiplicity of openings, located along substantially the entire area of the cushion means bottom, and extending through the cushion means;

air confining means having lower air entrance means communicating with said upper opening in the bellows and upper air exit means in communication with all of said openings in said cushion means bottom;

said openings in the cushion means bottom including a first group of openings which does and a second group of openings which does not overlie the upper opening in said bellows;

each of the openings in said second group having an area, at the cushion means bottom, larger than the area of an opening in said first group;

said area of an opening in said second group increasing progressively in relation to the distance of said opening from said bellows, as measured along the bottom of the cushion.

9. In a seat:

a cushion member;

a seat plate;

means connecting the lower front portion of said cushion member to the front of said seat plate to permit tilting of the cushion member, relative to said seat plate, about said connecting means, and through a plurality of tilted positions;

spring means between said seat plate and said cushion member, behind said connecting means, and normally urging said cushion member upwardly;

and means for locking said cushion member in a selected one of said tilted positions.

10. A ventilated seat comprising:

cushion means;

a plate spaced below said cushion means;

means for resiliently supporting said cushion means on said plate;

bellows located between the cushion means and the plate and compressible in response to downward movement of said resiliently supported cushion means and expandable in response to upward movement of the resiliently supported cushion means;

an upper opening in said bellows;

means for admitting air into the bellows in response to expansion thereof;

and openings extending vertically through said cushion means and in communication with said upper opening in the bellows;

said cushion means comprising:

a cushion member;

a seat plate;

means mounting the lower front portion of said cushion member to the front of said seat plate to permit tilting of the cushion member, about said connecting means, relative to said seat plate;

spring means between said seat plate and said cushion member, behind said connecting means, normally urging said seat cushion member upwardly;

a slot in said seat plate behind the connecting means;

a bracket projecting downwardly from said cushion member and normally extending through said slot;

a plurality of notches in said bracket;

a rod;

and means mounting said rod on said plate for sliding movement of the rod in an axial direction between a first position in which the rod is engaged with one of said notches and a second position in which the rod is disengaged from the notches.

11. A ventilated seat as recited in claim 10 and comprising:

air confining means having lower air entrance means communicating with said upper opening in the bellows and upper air exit means in communication with all of said openings in said cushion means;

said seat plate having an opening therein;

said air confining means extending through said opening in said seat plate.

12. In a seat as recited in claim 9 and comprising:

a base plate located below said seat plate;

means for resiliently supporting said seat plate on said base plate;

bellows located between the cushion member and the base plate and compressible in response to downward movement of said resiliently supported seat plate and expandable in response to upward movement of the resiliently supported seat plate;

an upper opening in said bellows;

means for admitting air into the bellows in response to expansion thereof;

openings extending vertically through said cushion member;

said seat plate having an opening therein;

and air confining means, extending through said opening in said seat plate, having lower air entrance means communicating with said upper opening in the bellows and upper air exit means in communication with all of said openings in said cushion member.

References Cited in the file of this patent

UNITED STATES PATENTS

| | | |
|---|---|---|
| 337,876 | Shepherd | Mar. 16, 1886 |
| 1,332,201 | Borgarello | Mar. 2, 1920 |
| 2,012,042 | Gerlofson | Aug. 20, 1935 |
| 2,272,124 | Lingle | Feb. 3, 1942 |
| 2,978,972 | Hake | Apr. 11, 1961 |
| 2,988,377 | Papst | June 13, 1961 |

FOREIGN PATENTS

| | | |
|---|---|---|
| 341,077 | Switzerland | Oct. 31, 1959 |

UNITED STATES PATENT OFFICE
CERTIFICATE OF CORRECTION

Patent No. 3,144,270            August 11, 1964

Raymond A. Bilancia

It is hereby certified that error appears in the above numbered patent requiring correction and that the said Letters Patent should read as corrected below.

Column 2, line 6, for "of", second occurrence, read -- on --; column 5, line 53, for "and" read -- the --; column 7, line 16, for "cushioning" read -- cushion --; column 9, line 15, after "plate," insert -- and --.

Signed and sealed this 24th day of November 1964.

(SEAL)
Attest:

ERNEST W. SWIDER
Attesting Officer

EDWARD J. BRENNER
Commissioner of Patents